United States Patent [19]

Zeller et al.

[11] Patent Number: 5,473,013
[45] Date of Patent: Dec. 5, 1995

[54] REDISPERSIBLE POLYMER POWDERS BY REDISTRIBUTION OF POLYVINYL ALCOHOL DISPERSANT

[75] Inventors: Thomas E. Zeller, Lehighton; Randall P. Bright, Allentown; Mark T. Phillips, Easton, all of Pa.

[73] Assignee: Air Products and Chemicals, Inc., Allentown, Pa.

[21] Appl. No.: 236,302

[22] Filed: May 2, 1994

[51] Int. Cl.$^6$ ............................ C08L 29/02; C08L 29/04
[52] U.S. Cl. ................................ 525/57; 525/56; 428/503
[58] Field of Search ......................... 525/57, 56; 428/503

[56] References Cited

U.S. PATENT DOCUMENTS

Re. 28,780  4/1976  Bergmeister et al. .................. 260/106
5,131,953  7/1992  Kasica et al. .............................. 127/65
5,252,704  10/1993  Bright et al. ............................. 528/501

*Primary Examiner*—W. Robinson Clark
*Attorney, Agent, or Firm*—Michael Leach; William F. Marsh

[57] ABSTRACT

A process for making a spray dried redispersible polymer powder, especially a VAE copolymer powder, by spray drying a polymer emulsion containing a polyvinyl alcohol redispersant. A sufficient amount of the total polyvinyl alcohol redispersant is added to the polymer emulsion prior to spray drying and the remaining amount of polyvinyl alcohol redispersant is added as a dry powder to the spray dried polymer powder.

20 Claims, No Drawings

REDISPERSIBLE POLYMER POWDERS BY REDISTRIBUTION OF POLYVINYL ALCOHOL DISPERSANT

FIELD OF THE INVENTION

The present invention relates to the manufacture of redispersible powders from an aqueous polymer emulsion mixed with a polyvinyl alcohol (PVOH) redispersant.

BACKGROUND OF THE INVENTION

Redispersible polymer powders are manufactured using a spray drying process. The throughput in a spray dry tower is most dependent upon the solids content of the feed stream and the temperatures at which the process is operated. Compared with many products made by a spray drying process, redispersible polymer powders are run at very low production rates. The solids concentration in the feed stream is low due to the high viscosity associated with the polymers both dissolved and dispersed in the aqueous medium and the operating temperatures are low due to the thermal sensitivity of the product. The combination of the low solids and low temperatures yields a very low productivity for a given size dryer. The low production rates ultimately are reflected in the total manufacturing cost of producing these products.

In the manufacture of many polymer powders, the aqueous polymer emulsion is mixed with PVOH redispersant. The PVOH is dissolved in water, blended with the emulsion and the aqueous mixture is spray dried. An inert filler such as clay is blended with the spray dried powder to keep the material free flowing. When mixed with water, the PVOH within the redispersible powder dissolves and the copolymer particles are redispersed to the original wet polymer emulsion.

In some cases the amount of PVOH present in the powder product is much greater than that required to make the final product redispersible. Such higher levels of PVOH are used because of the physical properties which the PVOH imparts to the final product. These properties include improved adhesion to wood when the redispersible powder is used in a cementitious formulation such as a thin set mortar and improved blocking/storage.

SUMMARY OF THE INVENTION

The present invention is an improvement in the process for making a spray dried redispersible polymer powder using PVOH as a redispersant. The improvement comprises adding a sufficient amount of the total PVOH (to be present in the final polymer powder) to the aqueous polymer emulsion to render the resulting polymer powder redispersible, spray drying the aqueous polymer emulsion containing the PVOH to a dry powder and mixing the remaining amount of the total PVOH as a dry particulate to the dry polymer powder.

By removing a portion of the PVOH from the wet end of the spray dry process, i.e., the PVOH/emulsion feed, higher production rates can be achieved. The remainder of the PVOH, from the standard composition is dry blended with the redispersible powder, thereby maintaining the desired final composition. The amount of PVOH redispersant in the formulation which is added to the aqueous emulsion and processed through the spray dry tower would be the minimum amount required to achieve redispersibility of the polymer.

This process provides for higher production rates:

1. Since PVOH contributes significantly to the viscosity of the wet feed to the spray dry tower, the reduced amount of PVOH in the wet feed allows the concentration of the polymer in the feed to be adjusted upward until the viscosity nears the maximum which can be adequately atomized. Thus, higher polymer solids concentrations yield higher throughputs given a constant total wet feed rate.

2. The capacity of the spray dry tower is often expressed as an evaporative capacity. That is, the amount of pounds of water that the drying air can evaporate per minute. A liquid feed higher in solids has less water per pound of feed. Therefore, it is possible to produce higher feed flow rates for a given evaporative capacity.

3. The PVOH which is post-blended with the redispersible powder bypasses the spray dry tower, thereby contributing to the total production rate without impacting on the spray dry tower capacity.

Thus the energy used per pound of production is significantly reduced through the use of this process. The energy used is closely related to the pounds of water evaporated per pound of production. In addition, polymer powders produced by this process have significantly higher bulk densities than those produced with the standard process. Higher bulk densities are advantageous in packaging since more product can be shipped for a given volume.

Moreover, the powder products produced with this process have superior blocking resistance compared to those produced with the standard process in which all the PVOH provided in the final powder product is added to the aqueous polymer emulsion prior to the spray drying, i.e., added upfront. The PVOH added as a dry powder to the product acts in a very similar manner to the anti-caking agent added to the product. The use of PVOH as an anti-caking agent may allow polymer powders to be produced with lower or reduced use of clay as an anti-caking agent. This would be desirable in cases where the traditionally used anti-caking agent is incompatible with the final product application.

DETAILED DESCRIPTION OF THE INVENTION

In manufacturing redispersible polymer powders, the polymers along with PVOH are spray dried from a liquid dispersion to a dry powder form. The PVOH in the product is an aid for redispersion and gives improved performance properties when used as a cement modifier. In the spray drying process the liquid feed is atomized to a very fine spray and brought into contact with hot drying air in a spray drying tower, thereby evaporating the water leaving a dry polymer product. Due to viscosity restrictions the compositions containing higher levels of PVOH must be diluted to a lower solids content, thereby causing more water to be evaporated in the spray dry process. According to the present invention, powder products of a high PVOH content can be spray dried at much higher production rate by redistributing a portion of the PVOH redispersant from the liquid polymer dispersion and dry blending it with the polymer product subsequent to the spray dry process.

The invention provides a method for making polymer powder by spray drying an aqueous polymer emulsion of about 30 to 65 wt. % solids. The polymer emulsion comprises an aqueous medium having colloidally dispersed therein a polymer comprising at least one free radical polymerizable monomer. The polymer emulsion is prepared by polymerizing the monomer(s) in the presence of a stabilizing system which may comprise ionic and/or nonionic and/or protective colloids well known in the art of polymer polymerization. For the purposes of preparing spray dried polymer powders from the emulsions, PVOH is the preferred stabilizing agent.

The polymer dispersions for the preparation of the redispersible polymer powders can be obtained in a conventional manner by aqueous emulsion polymerization of olefinically unsaturated monomers in the presence of the usual polymerization initiators and emulsifiers at elevated temperatures, for example up to about 95° C. The mean particle size can be adjusted by conventional measures, for example via the type and amount of the emulsifiers: for the preparation of coarse-particle polymer dispersions, a small amount of emulsifier and nonionic or highly ethoxylated ionic emulsifiers are generally advantageous. Protective colloids other than PVOH, for example PVP and cellulosics, frequently have an advantageous effect. Thus the emulsifying agents composing the stabilizing system which can be used in the polymerization recipe for making the non-PVOH containing polymer dispersions include ionic and nonionic surfactants, preferably the nonionic types which are well known to those skilled in the polymerization art. Suitable nonionic emulsifying agents include poly(ethyleneoxy) condensates. Other emulsifying agents include protective colloids, such as PVP and the cellulose materials such as methyl cellulose, hydroxyethyl cellulose, hydroxypropylmethyl cellulose and the like.

The concentration range of the total amount of the emulsifying agents useful is from 0.5 to 10%, preferably 1.5 to 5%, based on total emulsion.

Preferred polymer dispersions have a mean particle diameter (weight average) of from 100 to 5,000 nm, in particular from 650 to 5,000 nm. The measurement of the mean particle size of polymer dispersions, for example with the aid of an ultra centrifuge, is familiar to the skilled worker. The LT value i.e. the light transmittance of the aqueous dispersion diluted to 0.01% by weight, a standard parameter, can also be used as a measure of the mean particle size of a polymer dispersion of similar monomer composition.

In the preparation of the polymer powders, the polymer content of the dispersion may vary from 30 to 65 wt. %, in particular from 45 to 60 wt. %. The polymers generally have glass transition temperatures (Tg) of from +50° to −60° C., polymers having a Tg of less than +25° C. preferably being used.

Examples of olefinically unsaturated monomers from which the polymers may be derived are vinyl aromatic monomers, such as styrene, monoolefinically unsaturated carboxylates of, in general, 4 to 14 carbon atoms, in particular acrylates and methacrylates of alkanols of 1 to 8 carbon atoms, and vinyl esters, in particular of acetic and propionic acids, as well as vinyl laurate and vinyl esters of versatic acids. Other suitable polymers are those which are derived from vinyl chloride and/or vinylidine chloride or from ethylene and diolefins, in particular butadiene. In addition, the polymers may contain, as polymerized units, acrylonitrile and/or mono- and/or dicarboxylic acids of, in general, 3 to 5 carbon atoms and/or their amides which may be substituted at the nitrogen atom, in particular acrylic acid, methacrylic acid, iraconic acid, acrylamide, methacrylamide, N-methylol (meth)acrylamide and N-ethoxymethyl (meth)acrylamide. The amount of such monomers can be varied within wide ranges. It is from 0 to 40 wt. %, frequently from 10 to 30 wt. %, in the case of acrylonitrile and frequently from 0.5 to 5 wt. %, in particular from 1 to 4 wt. %, in the case of monoolefinically unsaturated monomers having polar groups, such as acrylic acid or N-methylol methacrylamide. The polymers may also contain, as polymerized units small amounts of olefinically unsaturated esters of alkanediols such as ethylene glycol monoacrylate (2-hydroxyethyl acrylate) and diacrylate and the corresponding methacrylates and propane-1,2-diol and butane-1, 4-diol monoacrylates and diacrylates and the corresponding methacrylates. Finally, polymer dispersions which contain, as polymerized units, ethylene and vinyl acetate in a molar ratio of, in general, from 15:85 to 85:15 are also suitable.

Other preferably used copolymers are those of acrylates and methacrylates of alkanols of 1 to 8 carbon atoms, which may contain, as polymerized units, not more than 65 wt. % in particular from 15 to 60 wt. %, styrene or a mixture of styrene and not more than 40 wt. % based on the styrene/acrylonitrile mixture of acrylonitrile.

The preferred polymers for practicing the present invention are polymers consist essentially of vinyl acetate and 0 to 40 wt. %, especially 5 to 30 wt. %, ethylene. The copolymers would have a Tg from −15° to 38° C.

In the preparation of the polymer powders, PVOH which is 85 to 99 mole % hydrolyzed, especially 87 to 89 mole % hydrolyzed, and having a degree of polymerization (DPn) ranging from 140 to 2100, preferably 335 to 1330, can be used. Such PVOH's are suitably used as the PVOH which is added upfront to the polymer emulsion, i.e., prior to the spray dry tower, and also as the post-add to the polymer powder. With regard to the post-added PVOH, the smaller particle size distribution PVOH's are preferred, for example, PVOH's having a particle size of 10 to 500 microns, preferably 10 to 175 microns, such as, for example, Airvol® 205S and 523S PVOH's. Such PVOH's enhance the anti-caking effect (improved blocking resistance) and solubilize faster leading to faster redispersion of the polymer.

Of the total amount of PVOH in the final polymer powder product, a portion of that, at least an amount effective for redispersing the dried polymer powder in water, is added to the polymer emulsion prior to spraying. This PVOH addition may be made to the polymer emulsion upon completion of the polymerization reaction. Such amounts may advantageously range from 2 to 40 wt. %, preferably 4 to 20 wt. %, based on the polymer content of the aqueous polymer emulsion.

Spray drying, or atomization, of the aqueous polymer dispersions which contain PVOH redispersant can be carried out in a conventional manner well known in the art, in particular using pressure or multi-phase nozzles or atomizer discs. The dispersions are generally atomized in a warm air stream, in which the water evaporates. Atomization can be carried out under atmospheric or reduced pressure. In general, the temperature of the warm air stream used for spray drying is from 100° to 200° C., in particular from 120° to 170° C. The dry redispersible polymer powders can be separated off in a conventional manner, in particular using cyclones and bag filters. To this resulting polymer powder is added the remaining amount of the PVOH as a dry particulate composition.

It has also been found advantageous in some systems to add inert flow materials such as clay, chalk, talc, silica other fine sized particle, to reduce the tendency of the redispersible powder to block over long term storage. The use of range of fillers is from 0 to 40 wt. %, based on the redispersible polymer powder, preferably from 8 to 30 wt. %. The amount of filler material used depends on the particular polymer and its Tg.

In the preferred practice of the invention, vinyl acetate-ethylene (VAE) copolymer powders having superior blocking resistance and significantly higher bulk densities are obtained in a high yield and can be readily stored at room temperature, without caking. The VAE copolymer powders are readily redispersible in water.

As modifiers for cementitious mixtures, the polymer powders at 5 to 30 wt. % are mixed with cement. Further processing by mixing with water and if necessary mineral additives gives mortars having good flow and high flexibility.

EXAMPLE 1

A PVOH stabilized VAE copolymer emulsion in which the copolymer comprised 86 wt. % vinyl acetate and 14 wt. % ethylene and had a Tg of 8° C. was blended with a 50/50 mixture of Airvol® 205 PVOH (87–89 mole % hydrolyzed; DPn=335–605) and Airvol 523 PVOH (87–89 mole % hydrolyzed; DPn=1000–1500) to form a spray dry feed having the following composition and properties:

24.66% VAE copolymer solids 4.33% PVOH 71.0% water

This spray dry feed having a viscosity of 120 cps was fed through the spray dry tower at a rate of 454 g/min. As a result, 132 g/min of dry polymer powder were produced and 323 g/min of water were evaporated. To this powder product 16 g/min of clay were added to act as an anti-caking agent. The final throughput was 148 g/min (dry powder) and 2.18 grams of water were evaporated for each gram of final product.

EXAMPLE 2

In this Example the procedure of Example 1 was followed except that a portion of the PVOH was omitted from the spray dry feed and the copolymer solids content was adjusted so that the spray dry feed had a viscosity of 120 cps.

The composition of the spray dry feed was 33.11% VAE copolymer solids 2.88%, PVOH 64.0% water This spray dry feed was fed to the spray dry tower at a rate of 505 g/min. As a result, 182 g/min of dry polymer powder were produced and 323 g/min of water were evaporated (same as in Example 1). To this product, 21 g/min of clay was added as an anti-caking agent and 15 g/min of finely ground PVOH were blended with the product stream. The final throughput was 218 g/min (dry powder) and only 1.48 grams of water were evaporated for each gram of final product. This product had improved blocking resistance compared to the product of Example 1 and had a bulk density of 447 g/l compared to 345 g/l of Example 1.

EXAMPLE 3

In this Example a vinyl acetate polymer emulsion was used in making the polymer powder. The spray dry feed composition comprised 80% vinyl acetate polymer having a Tg of 38° C. and 20% AIRVOL 523 PVOH, on a dry weight basis. The composition and properties of the spray dry feed were 16.9% vinyl acetate polymer 4.2% PVOH 78.9% water The spray dry feed stream having a viscosity of 187 cps was fed to the spray drier at 156 g/min. As a result, 33.3 g/min of dried polymer powder were produced and 123 g/min of water were evaporated, or 3.73 grams of water evaporated per gram of powder product.

EXAMPLE 4

In this Example the process of Example 3 was repeated except that a portion of PVOH was left out from the spray dried feed to the tower. The composition and properties of the feed stream were:

26.01% vinyl acetate polymer solids 2.89% PVOH 71.1% water 172 cps viscosity

The spray dry feed was fed to the spray drier at 173 g/min.

As a result 50 g/min of dry polymer powder were produced and 123 g/min of water were evaporated. To the polymer powder, 6.3 g/min of AIRVOL 523S PVOH was blended to yield a total production of 56.3 g/min of product having the same overall composition as that of Example 3. This represents an increase in productivity of 171% compared to the conventional process of Example 3. The amount of water evaporated per gram of powder product was reduced to 2.13 grams. In addition, the product had improved blocking resistance compared to the product of Example 3 and had a bulk density of 359 g/l compared to 216 g/l of Example 3.

EXAMPLE 5

In this Example, the two redispersible VAE powders from Examples 1 and 2 were tested in cementitious applications. In the Example 1 powder all the PVOH redispersant (17.6 wt. % based on VAE copolymer) was all added to the aqueous VAE copolymer emulsion comprising the spray dry feed stream. The Example 2 powder was a VAE copolymer powder in which the copolymer emulsion was spray dried with 8 wt. % PVOH (based on copolymer) in the aqueous emulsion spray dry feed stream, with the remaining PVOH post-added after drying.

The two powders were evaluated in a tile mortar formulation and a patching and repair mortar. Results are shown in Tables 1 and 2.

TABLE 1

| | TILE MORTAR | |
|---|---|---|
| | A | B |
| Type 1 Cement | 400 | 400 |
| P-60 Sand | 545 | 545 |
| Tylose MH6000XP | 5 | 5 |
| Calcium Formate | 10 | 10 |
| Example 1 | 40 | — |
| Example 2 | — | 40 |
| Water | 250 | 250 |
| Workability | Very Good | Very Good |
| Density (g/cc) | 1.42 | 1.36 |
| Shear Strengths (psi) | | |
| 7 day vits* | 311 | 329 |
| 7 day + 7 day wet vits | 168 | 187 |
| 7 day quarry | 290 | 279 |
| 7 day wood to quarry | 211 | 227 |

*Vitreous tile

In the tile mortar formulation, all samples had an identical water demand. The mortars were all smooth and creamy with no discernable change in viscosity over time. The densities of all mixes were also comparable. The shear bond strength of Run B (Example 2 powder) was virtually identical to the Run A control (Example 1 powder).

TABLE 2

PATCHING COMPOUND

|  | A | B |
| --- | --- | --- |
| ASTM C109 Sand | 1833 | 1833 |
| Type 1 Portland Cement | 667 | 667 |
| Example 1 | 100 | — |
| Example 2 | — | 100 |
| Colloids (Drops) | 52 | 52 |
| Water | 355 | 355 |
| Density (g/cc) | 1.93 | 1.95 |
| Flow % | 112 | 111 |
| Set Time (h) | | |
| Initial | 6.8 | 6.2 |
| Final | 9.2 | 8.3 |
| Physical Properties | | |
| 7 day compressive (psi) | 2790 | 2780 |
| 7 day tensile (psi) | 452 | 480 |
| 7 day + 1 day wet tensile (psi) | 178 | 170 |
| 7 day + 1 day water absorption (g) | 6.0 | 5.9 |
| 1 day abrasion resistance (g lost) | 1.4 | 1.6 |
| 7 day abrasion resistance (g lost) | 1.2 | 1.0 |
| 7 day tensile adhesion bond strength (psi) | 191 | 185 |

Evaluation in the patching and repair of mortar showed the flow values for all formulations (Runs A and B) were identical at the same water demand. The set times were identical for Runs A and B. Upon evaluation of physical properties, Run B (Example 2 powder) was virtually indistinguishable from the Run A control (Example 1).

Thus it can be seen that Example 2 (which was Example 1—based powder with PVOH post-added) had identical performance to the Example 1 control in tile mortar and patching applications.

STATEMENT OF INDUSTRIAL APPLICATION

The present invention can be used to prepare spray dried polymer powder having increased bulk density at a faster throughput rate.

We claim:

1. In a process for making a spray dried redispersible polymer powder by spray drying an aqueous polymer emulsion containing a polyvinyl alcohol redispersant, the improvement which comprises adding to the aqueous polymer emulsion prior to spray drying an amount of polyvinyl alcohol, which amount is a portion of the total polyvinyl alcohol content of the final powder product and is effective to redisperse the dry polymer powder from the spray drying in water, spray drying the polyvinyl alcohol-containing aqueous polymer emulsion to a dry polymer powder and mixing the remaining amount of the total polyvinyl alcohol content as dry particulate into the dry polymer powder.

2. The process of claim 1 in which the amount of polyvinyl alcohol added to the aqueous polymer emulsion is 2 to 40 wt. %, based on the polymer content of the emulsion.

3. The process of claim 1 in which the amount of polyvinyl alcohol added to the aqueous polymer emulsion is 4 to 20 wt. %, based on the polymer content of the emulsion.

4. The process of claim 1 in which the polyvinyl alcohol is 85 to 99 mole % hydrolyzed and has a DPn ranging from 140 to 2100.

5. The process of claim 1 in which the polyvinyl alcohol is 87 to 89 mole % hydrolyzed and has a DPn ranging from 140 to 2100.

6. The process of claim 1 in which the polyvinyl alcohol added to the emulsion is 87 to 89 mole % hydrolyzed and has a DPn ranging from 335 to 1330.

7. The process of claim 1 in which the polyvinyl alcohol added to the polymer powder is 87 to 89 mole % hydrolyzed and has a DPn ranging from 335 to 1330.

8. The process of claim 1 in which the polyvinyl alcohol added to the polymer powder has a particle size of 10 to 500 microns.

9. The process of claim 1 in which the polyvinyl alcohol added to the polymer powder is 87 to 89 mole % hydrolyzed and has a DPn ranging from 335 to 1330 and a particle size of 10 to 500 microns.

10. The process of claim 9 in which about 50 wt. % of the total polyvinyl alcohol content of the final powder product is added to the polymer emulsion and about 50 wt. % is added as dry particulate to the dry polymer powder.

11. The process of claim 1 in which about 50 wt. % of the total polyvinyl alcohol content of the final powder product is added to the polymer emulsion and about 50 wt. % is added as dry particulate to the dry polymer powder.

12. In a process for making a spray dried redispersible polymer powder by spray drying an aqueous polymer emulsion containing a polyvinyl alcohol redispersant, the improvement which comprises adding to the aqueous polymer emulsion prior to spray drying an amount of polyvinyl alcohol, which amount is a portion of the total polyvinyl alcohol content of the final powder product, is effective to redisperse the dry polymer powder from the spray drying in water and is 2 to 40 wt. % based on the polymer content of the polymer emulsion, the added polyvinyl alcohol being 85 to 99 mole % hydrolyzed and having a DPn in the range of 140 to 2100, spray drying the polyvinyl alcohol-containing aqueous polymer emulsion to a dry polymer powder and mixing the remaining amount of the total polyvinyl alcohol content as dry particulate into the dry polymer powder, the remaining polyvinyl alcohol being 85 to 99 mole % hydrolyzed and having a DPn in the range of 335 to 1330 and a particle size in the range of 10 to 500 microns.

13. The process of claim 12 in which the polyvinyl alcohols added to the emulsion and to the polymer powder are 87 to 89 mole % hydrolyzed and have a DPn ranging from 335 to 605.

14. The process of claim 13 in which the polyvinyl alcohol added to the polymer powder has a particle size of 10 to 175 microns.

15. The process of claim 13 in which about 50 wt. % of the total polyvinyl alcohol content of the final powder product is added to the polymer emulsion and about 50 wt. % is added as dry particulate to the dry polymer powder.

16. The process of claim 12 in the polymer consists essentially of vinyl acetate and 0 to 40 wt. % ethylene.

17. The process of claim 12 in the polymer consists essentially of vinyl acetate and 5 to 30 wt. % ethylene.

18. The process of claim 12 in which about 50 wt. % of the total polyvinyl alcohol content of the final powder product is added to the polymer emulsion and about 50 wt. % is added as dry particulate to the dry polymer powder.

19. In a process for making a spray dried redispersible polymer powder by spray drying an aqueous polymer emulsion containing a polymer consisting essentially of vinyl acetate and 0 to 40 wt. % ethylene and a polyvinyl alcohol redispersant, the improvement which comprises adding to the aqueous polymer emulsion prior to spray drying an amount of polyvinyl alcohol, which amount is a portion of the total polyvinyl alcohol content in the final powder product, is effective to redisperse the dry polymer powder from the spray drying in water and is 4 to 20 wt. % based on the polymer content of the polymer emulsion, the added polyvinyl alcohol being 87 to 89 mole % hydrolyzed and having a DPn in the range of 335 to 1330, spray drying the polyvinyl alcohol-containing aqueous polymer emulsion to a dry polymer powder and mixing the remaining amount of the total polyvinyl alcohol content as dry particulate into the dry polymer powder, the remaining polyvinyl alcohol being 87 to 89 mole % hydrolyzed and having a DPn in the range of 335 to 605 and a particle size in the range of 10 to 175 microns.

20. The process of claim 19 in which about 50 wt. % of the total polyvinyl alcohol content of the final powder product is added to the polymer emulsion and about 50 wt. % is added as dry particulate to the dry polymer powder.

* * * * *